United States Patent

Bliss et al.

[11] Patent Number: 5,465,582
[45] Date of Patent: Nov. 14, 1995

[54] CRYOGENIC LIQUID DISPENSERS

[75] Inventors: Anthony P. S. Bliss, Cambridge; Jacek T. Gabzdyl, Guildford, both of England

[73] Assignee: The BOC Group plc, Windlesham, England

[21] Appl. No.: 241,232

[22] Filed: May 10, 1994

[30] Foreign Application Priority Data

May 11, 1993 [GB] United Kingdom .................. 9309637

[51] Int. Cl.[6] .................................................. F17C 7/02
[52] U.S. Cl. ............................. 62/51.1; 62/50.1; 62/50.2; 62/50.4; 137/807; 137/827; 137/828
[58] Field of Search ........................... 62/50.1, 50.2, 62/50.4, 51.1, 64, 78; 137/807, 827, 828; 141/4; 222/146.5

[56] References Cited

U.S. PATENT DOCUMENTS 3,334,641  8/1967  Bjornsen ............................ 137/828
3,591,809  7/1971  Laakaniemi et al. ............... 137/827 X
4,203,299  5/1980  Dinglinger ........................... 62/50.1 X
4,499,931  2/1985  Urban ...................................... 141/67
4,523,433  6/1985  Takahashi et al. ...................... 62/60
4,546,609  10/1985  Roullet et al. ..................... 62/51.1 X
4,586,343  5/1986  Buschkens et al. ..................... 62/50.1
4,662,154  5/1987  Hayward ............................... 141/64 X
5,169,031  12/1992  Miller ................................. 62/50.2 X
5,272,881  12/1993  Lee ......................................... 62/50.4
5,385,025  1/1995  Kellett ................................. 62/50.1
5,400,601  3/1995  Germain et al. ........................ 62/50.1

FOREIGN PATENT DOCUMENTS 331287  9/1989  European Pat. Off. .
2397591  2/1979  France .

Primary Examiner—Christopher Kilner
Attorney, Agent, or Firm—R. Hain Swope; David A. Draegert; Larry R. Cassett

[57] ABSTRACT

An apparatus for dispensing a cryogenic liquid includes means for focusing a beam of energy, eg. laser energy from a source onto the liquid cryogen as it passes through an outlet from a cryogenic liquid container.

12 Claims, 1 Drawing Sheet

CRYOGENIC LIQUID DISPENSERS

The present invention relates to methods of and apparatus for dispensing cryogenic fluids.

BACKGROUND OF THE INVENTION

Liquid cryogens are used in a number of industrial processes. For example, liquid nitrogen droplet dispensers are currently used to provide an inert head space when packaging oxygen sensitive products such as coffee and peanuts. Liquid nitrogen dispensers are also used in the packaging of carbonated beers and soft drinks in cans to provide both an inert head space and for increasing the rigidity of the cans.

Each application of a liquid cryogen usually requires a particular droplet size and, when installed on a production line, for example, a canning line, it is important that the size of the droplet being dispensed is constant since a varying droplet size will lead to a great variation in can pressure.

European Patent Publication No. 0331287 discloses an apparatus for dispensing a cryogenic liquid which includes a reservoir having an electrically heated dispensing tube connected to the bottom of the reservoir. Liquid cryogen contained within the reservoir is metered by an electrically controlled solenoid valve which, when activated, closes off the dispensing tube. The dispensing tube is electrically heated so that liquid cryogen within the dispensing tube undergoes film boiling. The film boiled liquid cryogen within the dispensing tube acts to lubricate slugs of liquid cryogen that are dispensed from the dispensing tube when the solenoid valve is raised.

Cryogenic liquid dispensers incorporating a solenoid valve and a heater are relatively cumbersome and expensive. Furthermore, they cannot achieve the mass flow and dosing rates often required by industry.

It is an aim of the present invention to provide an apparatus for dispensing a liquid cryogen which does not incorporate a separate solenoid valve and heater.

SUMMARY OF THE INVENTION

Accordingly to one aspect of the present invention, an apparatus for dispensing a cryogenic liquid comprises a vessel for containing the liquid cryogen, an outlet from the vessel for the passage therethrough of the liquid cryogen and means for focusing a beam of energy on the liquid cryogen as it passes through the outlet.

The beam of energy may be a beam of laser light emanating, for example, from a $CO_2$ laser. Alternatively, it may be a beam of microwaves or a beam of ultrasonic waves.

Preferably, the outlet comprises a passage and the focusing means is arranged to focus the beam of energy immediately adjacent the distal end of the passage.

According to a further aspect of the present invention, a method of dispensing a cryogenic liquid comprises the steps of allowing the cryogenic liquid to flow along a predetermined path and focusing a beam of energy at the cryogenic liquid as it flows along the path so that the cryogenic liquid undergoes localised vaporisation.

The beam of energy can be applied intermittently to the cryogenic liquid thereby to create discrete droplets of liquid cryogen along said path.

DESCRIPTION OF THE PREFERRED EMBODIMENTS

Figure 1:
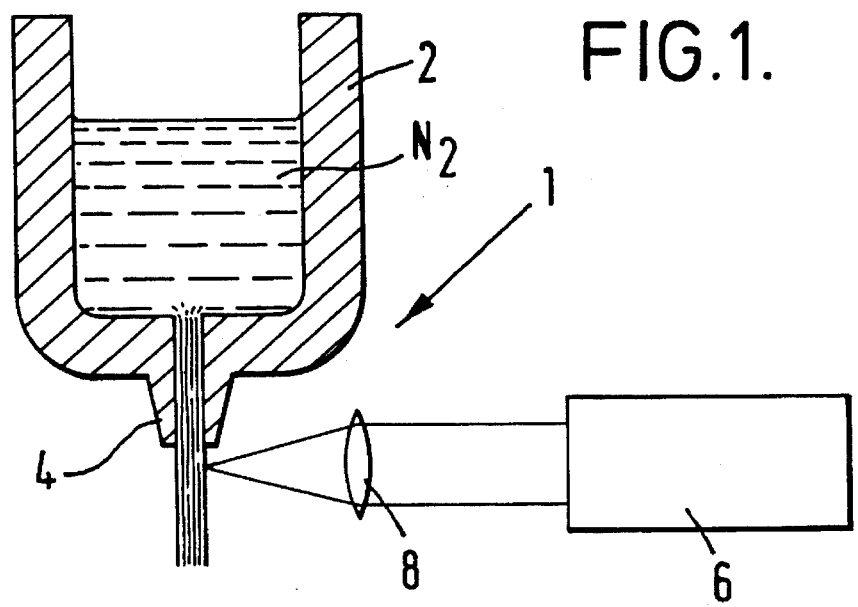
FIG. 1 is a diagrammatic sketch of an apparatus for dispensing a liquid cryogen.

An embodiment of the invention will now be described, by way of example, reference being made to the Figures of the accompanying diagrammatic drawing.

As shown, an apparatus 1 for dispensing a liquid cryogen, for example, liquid nitrogen, comprises a vessel 2 for containing the liquid nitrogen. The vessel 2 has an outlet in the form of a passage 4 which defines a path for the liquid nitrogen as it leaves the vessel 2.

Adjacent the vessel 2 there is located a source 6 of intermittent radiant energy, for example, a CO2 laser. The laser light emanating from the source 6 is focused as a beam of light on the liquid nitrogen at a point immediately adjacent the distal end of the passage 4 by focusing means 8 in the form of a lens.

Although not shown, a timing circuit can be provided which will operate the source 6 at preselected intervals.

Figure 2:
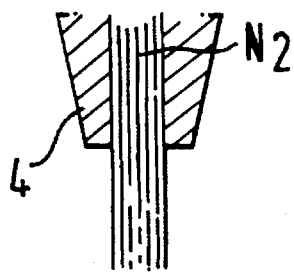
FIG. 2 is a detail of the apparatus of FIG. 1 illustrating a continuous stream of liquid cryogen leaving the apparatus.
Figure 3:
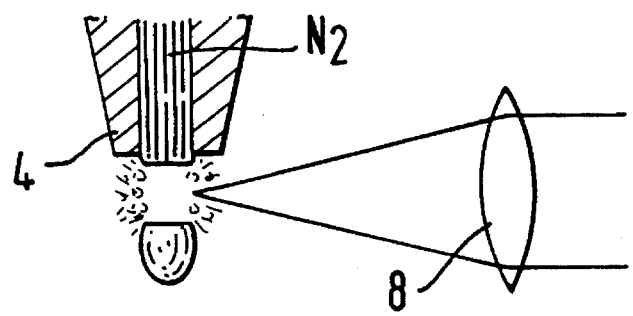
FIG. 3 is a detail similar to FIG. 2 illustrating droplets of liquid cryogen leaving the apparatus of FIG. 1.

In use, when a continuous stream of liquid nitrogen is required, then the source 6 of laser light will be inoperative and as illustrated in FIG. 2 a continuous stream of the liquid nitrogen will pass along the path defined by the passage 4. However, when it is desired to dispense the liquid nitrogen in droplet form then the laser light is intermittently applied to the liquid nitrogen stream adjacent the distal end of the passage 4 such that there is localised heating and sufficient energy is supplied to the liquid nitrogen that localised boiling/evaporation of the liquid nitrogen is achieved thereby creating droplets of a predetermined size dependent upon the preselected interval of time in which the source 6 is activated and then shut down.

The laser light is used as a direct method of energy transfer between the light and the liquid nitrogen.

When the laser light is applied to the liquid nitrogen for a long period of time, the vaporisation of the liquid nitrogen at the distal end of the passage 4 causes the passage to block. This effectively stops the flow of liquid nitrogen along the passage 4.

On a canning line, for example, the timing circuit will be set to cause the source 6 to assume a cyclical operation and any increase in the off time of the source 6 will increase the droplet size of the liquid cryogen and vice versa. This allows a particularly accurate droplet size to be dispensed into a moving line of, for example, food or beer cans.

It has been found, that the use of a laser source can provide a mass flow and dosing rate which is superior to the current techniques used for dispensing liquid cryogens.

Although reference has been made in the above described embodiment to a beam of energy in the form of a beam of laser light from a $CO_2$ laser; alternative beams of energy can be employed, for example, a beam of microwaves or a beam of ultrasonic waves.

We claim:

1. An apparatus for dispensing a cryogenic liquid comprising a vessel for containing the liquid cryogen, an outlet from the vessel for the passage therethrough of the liquid cryogen and means for focusing a beam of energy from a source on the liquid cryogen as it passes through the outlet.

2. An apparatus as claimed in claim 1, in which the outlet comprises a passage and the focusing means is arranged to focus the beam of energy immediately adjacent the distal end of the passage.

3. An apparatus as claimed in claim 1, in which the beam of energy is a beam of laser light.

4. An apparatus as claimed in claim 3, in which the laser light emanates from a CO2 laser.

5. An apparatus as claimed in claim 2, in which the beam of energy is a beam of laser light.

6. An apparatus as claimed in claim 5, in which the laser light emanates from a CO2 laser.

7. An apparatus as claimed in claim 1, in which the beam of energy is a beam of microwaves.

8. An apparatus as claimed in claim 2, in which the beam of energy is a beam of microwaves.

9. An apparatus as claimed in claim 1, in which the beam of energy is a beam of ultrasonic waves.

10. An apparatus as claimed in claim 2, in which the beam of energy is a beam of ultrasonic waves.

11. A method of dispensing a cryogenic liquid comprising the steps of allowing the cryogenic liquid to flow along a predetermined path and focusing a beam of energy at the cryogenic liquid as it flows along the path so that the cryogenic liquid undergoes a localised vaporisation.

12. A method as claimed in claim 7, in which the beam of energy is applied intermittently to the cryogenic liquid thereby to create discreet droplets of liquid cryogen along said path.

* * * * *